(No Model.) 3 Sheets—Sheet 1.
G. L. DAVIS & N. K. WRIGHT.
FILTER AND COOLER.
No. 543,677. Patented July 30, 1895.
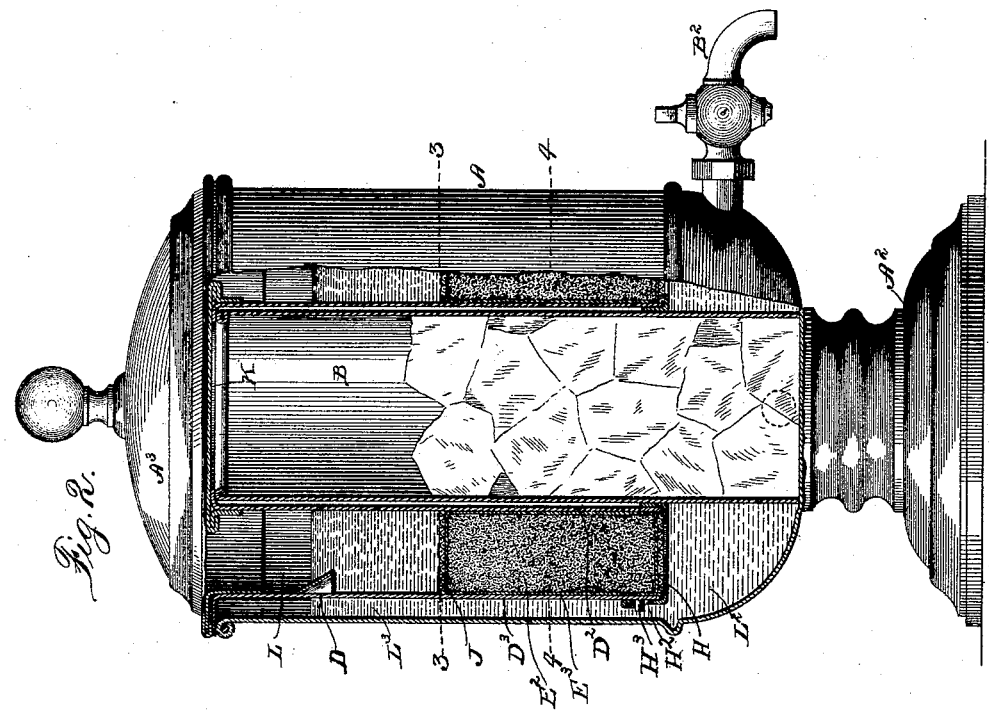
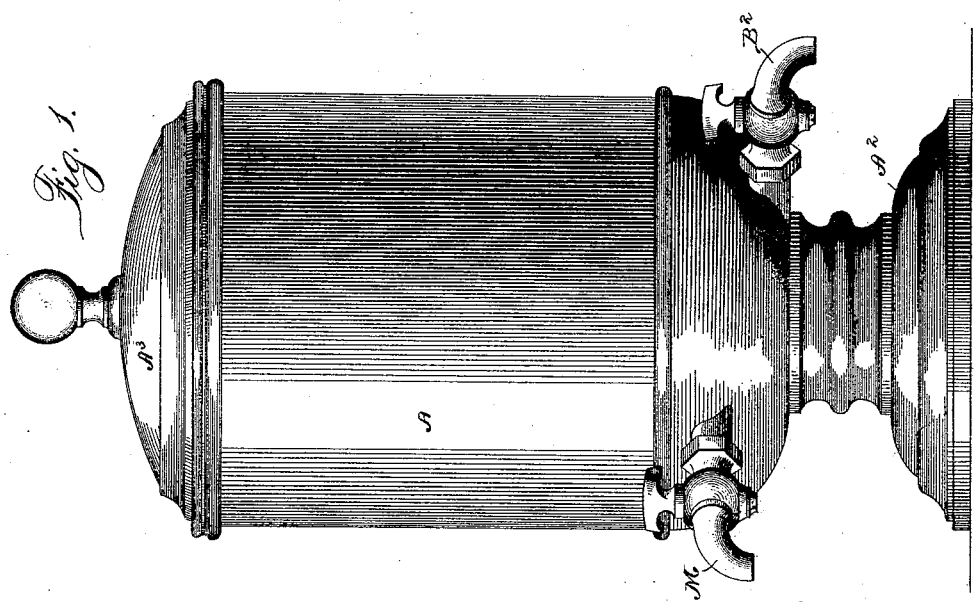
Witnesses:
John Enders Jr.
L. Allen Gardiner
Inventors
George L. Davis & Nightingale K. Wright,
by
Hill & Hill
Attorneys

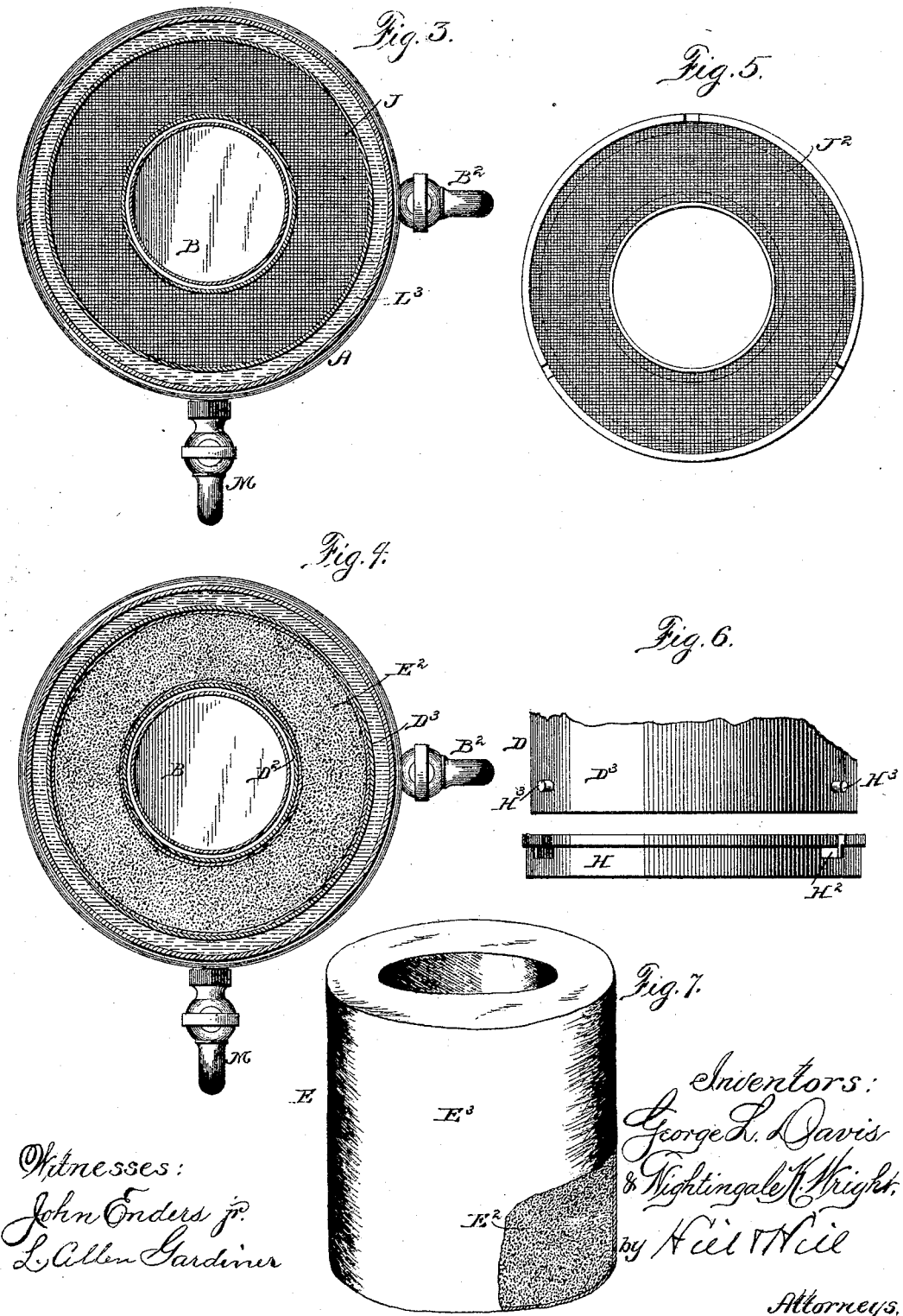

(No Model.) 3 Sheets—Sheet 3.

G. L. DAVIS & N. K. WRIGHT.
FILTER AND COOLER.

No. 543,677. Patented July 30, 1895.

Witnesses:
John Enders Jr.
L. Allen Gardiner

Inventors:
George L. Davis
& Nightingale K. Wright
by Hiit & Hiit
Attorneys.

UNITED STATES PATENT OFFICE.

GEORGE L. DAVIS AND NIGHTINGALE K. WRIGHT, OF CHICAGO, ILLINOIS.

FILTER AND COOLER.

SPECIFICATION forming part of Letters Patent No. 543,677, dated July 30, 1895.

Application filed May 5, 1894. Serial No. 510,232. (No model.)

*To all whom it may concern:*

Be it known that we, GEORGE L. DAVIS and NIGHTINGALE K. WRIGHT, citizens of the United States, residing at Chicago, county of Cook, and State of Illinois, have invented certain new and useful Improvements in Filters, of which the following is a description.

Our invention consists in a filter and cooler so constructed that the cooling-chamber is surrounded by a chamber, which is also a filter-bed-holding member, and is arranged to removably contain the filter-bed, which is enveloped in a sack. The chamber or filter-bed-holding member may be removed from the filter and the filter-bed from the chamber, when the bed may be sterilized and the parts repositioned, as before.

Our invention consists further in certain combinations, arrangements, and constructions to be particularly described, reference being now had to the accompanying drawings, in which—

Figure 8:
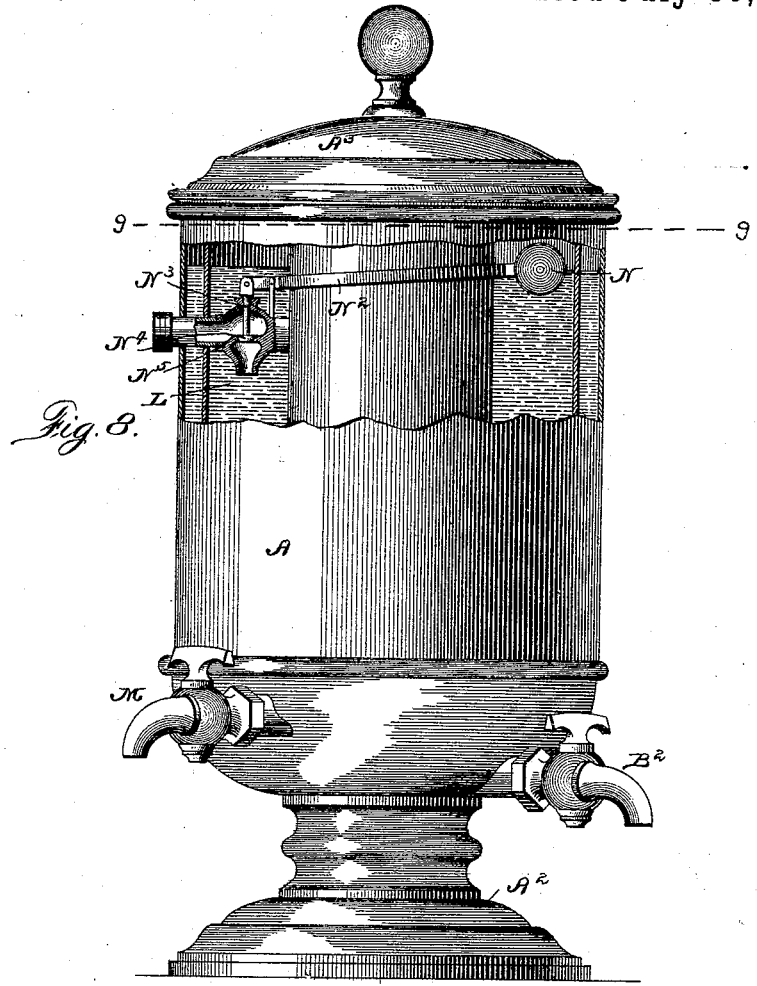
Figure 9:
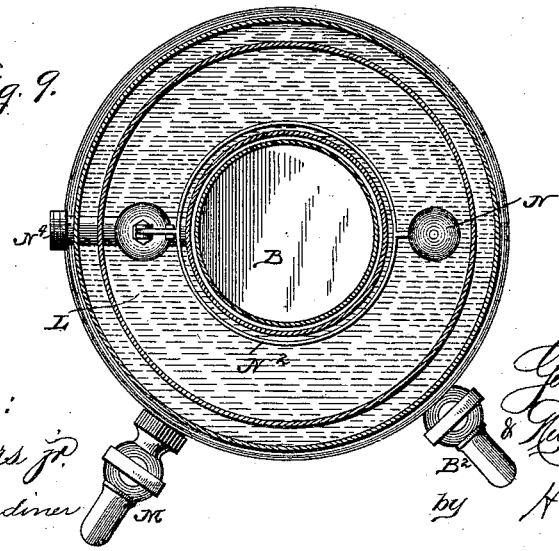

Figure 1 is a side elevation of the exterior of our improved filter. Fig. 2 is a like view broken away, showing the interior in vertical longitudinal section. Fig. 3 is a cross-sectional view on the line 3 3 of Fig. 2. Fig. 4 is a like view on the line 4 4 of Fig. 2. Fig. 5 is a plan view of the cap, which is attachable and detachable from the member holding the filter-bed. Fig. 6 is a detail view of the lower portion of the member holding the filter-bed, and showing the means of attachment between the cap and the lower portion of the member holding the filter-bed. Fig. 7 is a perspective view of the filter-bed, its containing-envelope being partly broken away to show the filtering material. Fig. 8 is a side elevation of the filter, partly broken at its upper portion, which filter is adapted for attachment to conducting members of a pressure-liquid supply, showing the means by which the quantity of unfiltered liquid is regulated and determined in admission to the interior of the filter. Fig. 9 is a cross-sectional view on the line 9 9 of Fig. 8.

The exterior casing of the filter is designated at A, having a suitable supporting-standard $A^2$ and cover $A^3$. Within the interior of the casing and centrally located is preferably a cylindrical ice-containing chamber B extending for the whole or nearly the whole of the vertical length of the filter. Tapped into the said chamber B, as shown by the dotted lines in Fig. 2, is a faucet $B^2$ for withdrawing the water accumulated within the said chamber B, the arrangement being such that the ice and accumulated water are completely isolated from the filtered liquid.

The filter-bed-holding cylinder D consists of an inner wall $D^2$ conforming closely to the form of the ice-chamber and an outer wall $D^3$ conforming closely to the outer shell of the filter, between which walls the filter-bed E is disposed and held. The filter-bed E consists of any suitable filtering material $E^2$, and is contained in an agglomerated annular mass by means of an exterior surrounding envelope or sack $E^3$. A cap H is provided having the angular slots $H^2$ adapted to engage the pins $H^3$ on the lower portion of the filter-bed-holding cylinder C, whereby said cap H may be attached to or detached from the said cylinder D.

The filter-bed-holding cylinder has located midway of its length a perforated diaphragm J, and the cap H is also provided with a like perforated diaphragm $J^2$. A cover K is provided for the top of the ice-chamber B.

By reference to Fig. 7 it will be observed that the filter-bed E is composed of the filtering material $E^2$ held in an agglomerated mass by means of a containing-envelope of asbestos, which material is of a sufficient porosity to permit the proper treatment of the filtering material for the purpose of sterilizing the same, and yet of a character which will resist separation, disintegration, or destruction of the envelope during this process. The filter-bed after sterilization is then positioned within the holding-cylinder D between the side walls $D^2$ and $D^3$, to which it clearly conforms, and the upper diaphragm J, after which the cap H is secured on the cylinder D by means of the angular slots $H^2$ and the pins $H^3$. The filter-bed E is then between the upper diaphragm J and the lower diaphragm $J^2$. When this is accomplished the filter-bed-holding cylinder D and the filter-bed E are introduced into the interior of the filter-casing A and disposed about the annular ice-chamber B, as shown in Fig. 2, a reservoir L being thus provided for the reception of the unfiltered liquid above the filter-bed E, and a reservoir $L^2$ being also provided for the filtered liquid below the filter-bed E, and also the extended reservoir L³ between the casing A and the outer wall D³ of the filter-bed-holding cylinder D.

It is now apparent that we provide a filter having parts which may be readily and conveniently separated in order to subject the filter-bed to a process of sterilization, and which said filter-bed is also maintained and held in an agglomerated mass having the same shape and contour, so as to be readily repositioned in its holding member and returned to the filter after having been treated. The filtered water may be drawn off by the faucet M.

In Figs. 8 and 9 we have shown a device for automatically regulating and determining the quantity of unfiltered liquid to be admitted into the reservoir L, comprising a float N connected by the arms $N^2$ passing about the ice-chamber B, and pivoted to the valve-rod $N^3$, operating the valve $N^4$, within the valve-casing $N^5$, which latter is adapted to be connected with the pipe of any source of liquid-supply under pressure.

The height of the liquid in the reservoir L determines the position of the valve $N^4$, opening the valve more or less, or closing the same completely, to automatically determine the quantity of admitted liquid.

Having thus described our invention, what we claim as new therein, and desire to secure by Letters Patent, is—

1. In a filter an exterior casing, having positioned therein a central ice chamber, and means for drawing water from each, in combination with a removable filter-bed holding member adapted to inclose the ice chamber, and a filter-bed inclosed within an envelope or sack and adapted to be removably positioned in said holding member, whereby the filter-bed holding member may be removed from the casing and the enveloped bed be removed therefrom and sterilized, and the parts be again positioned within the casing in ultimate proper relationship, substantially as described.

2. A filter and cooler composed of an ice chamber centrally located within an inclosing vessel, and means for drawing water independently from each, in combination with a removable annular vessel adapted to inclose the ice chamber and thus be located in the space between the ice chamber and the wall of the vessel, a perforated transverse partition dividing said annular vessel into a compartment above for unfiltered water and a filter-bed chamber below, a bed of filtering material inclosed in a removable annular envelope and adapted to closely fit within the filter-bed chamber, and a removable perforated bottom to said chamber, whereby the annular vessel may be readily removed from its position and the filter-bed also readily removed from said vessel for the purposes of sterilization, and the said parts be as readily re-positioned again within the filter, substantially as described.

GEO. L. DAVIS.
NIGHTINGALE K. WRIGHT.

In presence of—
C. E. WHITMORE,
ROY W. HILL.